United States Patent [19]

Halin et al.

[11] 4,297,844

[45] Nov. 3, 1981

[54] DEVICE FOR HYDRAULIC CONTROL OF THRUST REVERSAL FOR JET ENGINE

[75] Inventors: Yves R. Halin, Le Mee sur Seine; Jacques R. A. LeLandais, Melun, both of France

[73] Assignee: Societe Nationale d'etude et de Construction de Moteurs d'Aviation, Paris, France

[21] Appl. No.: 60,597

[22] Filed: Jul. 25, 1979

[30] Foreign Application Priority Data

Jul. 25, 1978 [FR] France ................................ 78 21896

[51] Int. Cl.³ .......................... F02K 1/72; F16D 31/02
[52] U.S. Cl. .................................. 60/226 A; 60/464; 417/324
[58] Field of Search .................. 60/226 A, 229, 459, 60/464; 417/324

[56] References Cited

U.S. PATENT DOCUMENTS 3,696,895 10/1972 Schaffer et al. .
3,846,982 11/1974 Rometsch .............................. 60/464
3,866,421 2/1975 Kersten et al. ........................ 60/464
4,191,094 3/1980 Flippo .............................. 60/226 A

FOREIGN PATENT DOCUMENTS 2067360 8/1971 France .
2143661 2/1973 France .

Primary Examiner—Robert E. Garrett
Attorney, Agent, or Firm—Oblon, Fisher, Spivak, McClelland & Maier

[57] ABSTRACT

Device for hydraulic control of thrust reversal units activated by jacks in a jet engine. The jacks are connected to a rotary hydraulic engine fed by a hydraulic circuit which involves a mechanism for slowing down the speed of the reversal units when they approach the stop units. The hydraulic circuit allows for directly subjecting the engine's capacity to the opposing load on the engine. Application of this invention is possible to a dual flow turbojet in which the reversal units rotate in the cold flow.

10 Claims, 7 Drawing Figures

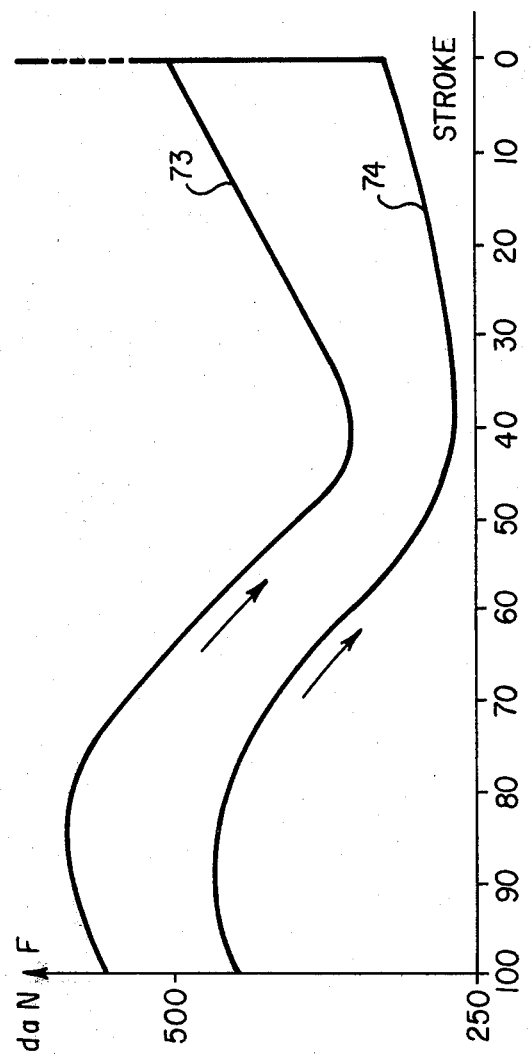

DEVICE FOR HYDRAULIC CONTROL OF THRUST REVERSAL FOR JET ENGINE

BACKGROUND OF THE INVENTION

1. Field of the Invention

This invention concerns a device for hydraulic command of thrust reversal for jet engines.

2. Description of the Prior Art

In jet or gas turbine aviation engines, there are known methods making it possible to reverse the propulsive thrust of the engine. These methods may be, principally in the case of cold flow use, of a classical type in which an engine commands at the same time both the rotation of deflecting flaps or barriers and the axial slide of panels covering the reversal grid. The reversing units are activated by jacks which are moved, through flexible shafts and geared transmissions, by a rotary hydraulic engine which is part of a hydraulic command device, itself fed by the aircraft's high pressure circuit.

There are two areas of uncertainty during the research phase of designing a thrust reverser: prior to flight testing, little is known about the real stresses to which the thrust reverser will be subject in operation, and little is known about how such stresses change over time. The difficulties stemming from these areas of uncertainty are compounded by the problems resulting from flow limits imposed by the hydraulic feed circuit of the aircraft, while the device's required response time is very short, on the order of 1.5 second. Accordingly, optimal use must be made of whatever maximum flow is available.

SUMMARY OF THE INVENTION

The objects of this invention therefore are to: automatically adjust the point at which the hydraulic motor that activates the reversing units functions in light of the stresses on the reversing elements at each particular moment; provide hydraulic damping at the engine's high capacity, and hence at reduced pressure; and ensure that the reversing units are held against their stops by virtue of tension on the flexible shafts, the torque provided by the engine at maximum capacity producing torque in the flexible shafts which keep the units in question against their stops.

In conformity with the present invention, the hydraulic circuit includes methods of directly subjecting the engine's capacity to the back pressure from the engine, with the difference between the feed pressure and the back pressure being a function of the opposing load on the engine.

This arrangement makes it possible to achieve optimal adjustment of the torque provided by the engine as a function of the load opposing it.

In the case of an axial piston engine, known earlier techniques include a command device in which the angle of the plate which determines the engine's capacity may be set at three fixed positions only, whereas in accordance with the invention, the engine is continually in service regardless of the position of the reverser.

In accordance with another characteristic of the invention, the engine's return conduit is connected, through a hydraulic damping valve controlled by the joint action of an engine feed distributor and a mechanical unit for returning the reversing units to their positions, to a command jack controlling the engine's capacity, while the pressure in the engine's return circuit is controlled by a flow limiting device connected with a low pressure return conduit and by an adjustable recirculation valve tied into the engine's high pressure feed conduit.

This device requires no power consumption when there are "helping", and not "resisting", loads present. The engine is then used as a pump and, as its return pressure rises, the capacity is set at its minimum value, making it possible to increase the engine's speed. As a result, fluid recirculation takes place in the return direction through the engine's bypass valve. A governor situated beyond the valve limits the engine rotation velocity.

As the fully extended position must be approached at a slow speed so as to avoid damaging the mechanical stops, hydraulic damping is provided by restricting the engine's back pressure. To that end, a loss of load is brought about between the engine's back pressure and the device's return circuit such that the back pressure diminishes and the capacity is set at its maximum value. Damping at high capacity makes it possible to obtain the lowest possible internal engine pressures.

High engine capacity is used for a position in which the reversing units are at rest against the stops, a position at which there is maximum stress on the flexible shafts. This arrangement has the advantage of optimizing the transit time of the reversing units by constantly adapting the point at which the motor functions even in a situation where the load level varies. This makes it possible to do without pressure peaks either when there are "helping" loads or during hydraulic damping. It is also possible to use maximum static torque on the stops and thus provide a substantial advance load on the flexible shafts.

Finally, the device according to the invention frees the engine's rotational velocity from the available flow. Indeed, the flow may be in excess of the available flow thanks to the intervening recirculations in the pressure of "helping" loads.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characteris designate like or corresponding parts throughout the several views, and wherein:

FIGS. 4a to 4d are curves representing stresses on the jack.

DETAILED DESCRIPTION OF THE PREFERRED EMBODIMENTS

Figure 1:
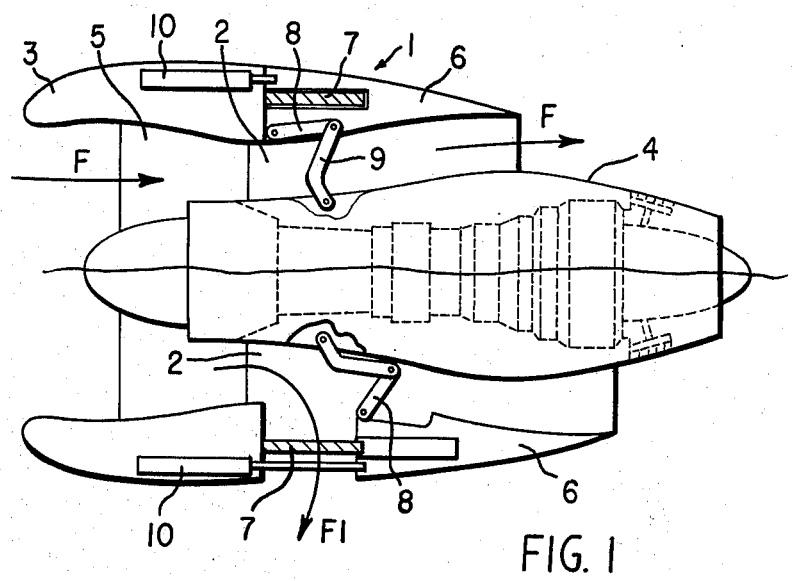
FIG. 1 is a longitudinal cross section of a turbojet in which the upper cutaway view represents the reversing units in a retracted position and the lower cutaway view shows the reversing units in the deployment position.

FIG. 1 shows a turbojet 1 with mixed flow, having a cold flow channel 2 delimited by an external cowling 3 and a central body 4 suspended by arms 5. When functioning in the normal forward direction, the cold flow passes through the channel 2 in the direction indicated by the arrows F from front to rear. The thrust reverser entails, as in the known manner, sliding panels 6 within which are arranged reversal grids 7 and reversal flaps or barriers 8 connected to the central part 4 by rods 9 and the sliding panels are activated by the jacks 10 attached to the cowling. To reverse the flow circulating in the channel 2, the jacks 10 are activated to push back the panels 6, uncovering the reversal grids and causing rotation of the reversal flaps or barriers 8, as represented on the lower cutaway view in FIG. 1. The cold flow is thus required to follow the path traced by arrow F1, which corresponds to its reversal.

Figure 2:
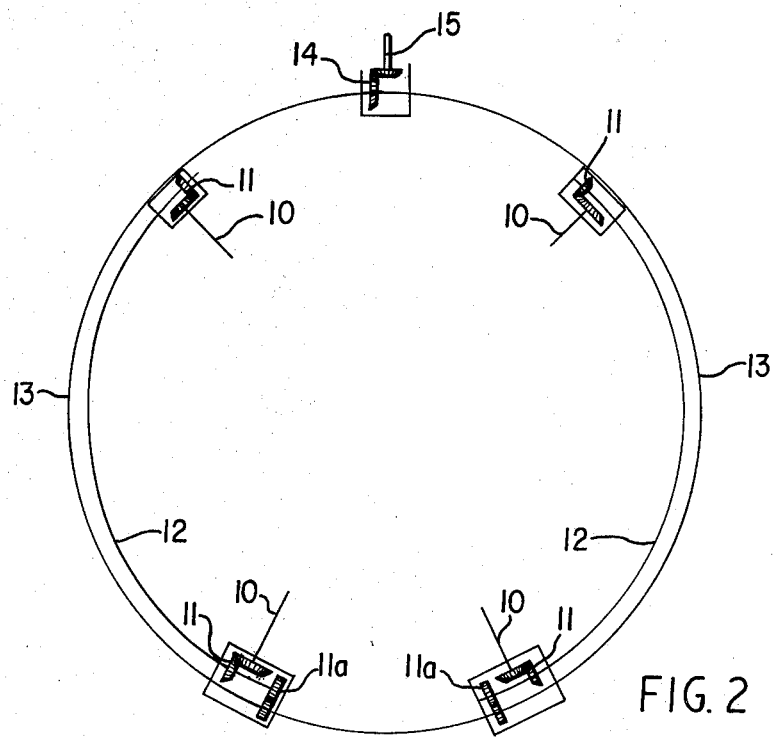
FIG. 2 is a schematic view representing the manner in which the engine is linked with the command jacks of the reversing units.

The jacks 10, four of which are represented in FIG. 2, are activated by the gear trains 11 and 11a and are interconnected by the flexible shafts 12, the gear trains 11a being connected by flexible shafts 13 to a gear train 14 and the shaft 15 of a hydraulic engine which may be any type with variable capacity. In the use depicted in FIG. 3, a known type of motor 16 (FIG. 3) is used, having axial pistons commanded by a plate, and with a capacity which may be modified by changing the angle of the plate.

Figure 3:
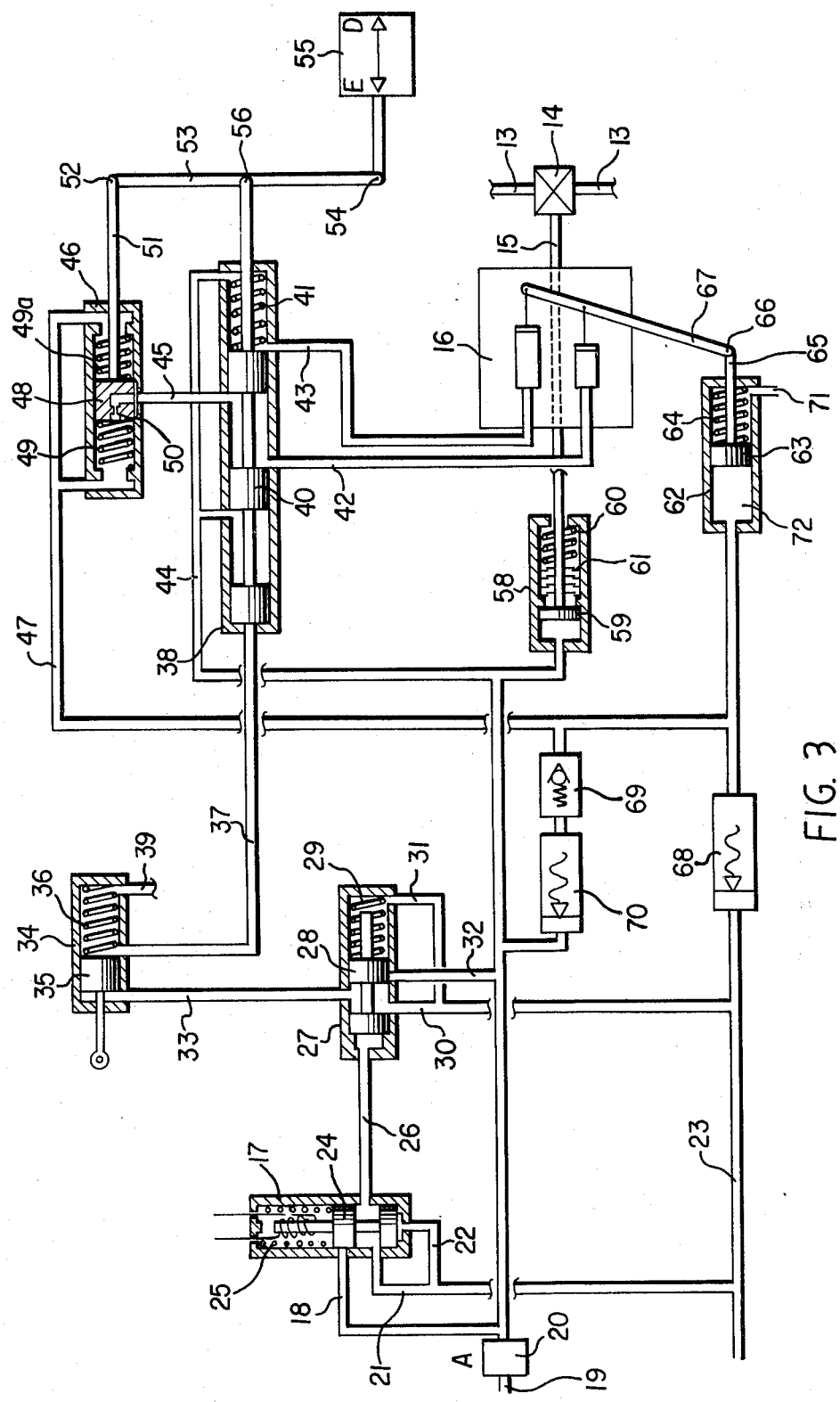
FIG. 3 is a schematic view of the device for the hydraulic command of thrust reversal in accordance with the invention.

The command device for the thrust reversal units 7 and 8 activated by the engine 16 represented in FIG. 3 includes an electric position gate 17 connected by a conduit 18 to a conduit 19 in the aircraft's high pressure feed circuit to which is attached a feed gate 20. Gate 17 mentioned above is connected by conduits 21 and 22 to a low pressure fluid return circuit 23. The electric gate 17 entails a slide-valve 24 which is held against the orifice of conduit 22 by the action of a spring 25 acting against the command electromagnet, the slide-valve 24 being capable of establishing a connection between conduits 18 and 21, tied in with the high pressure and low pressure respectively, and conduit 26, which terminates at one end at a position gate 27 whose slide-valve 28 is activated by pressure in conduit 26 against spring 29, the position gate 27 being capable of establishing, by means of its slide-valve 28, connection between a conduit 33 of a locking jack 34, a low-pressure conduit 30 and a high-pressure conduit 32, the slide-valve being subjected, on its face opposite conduit 26, to the action of the low pressure fluid through a conduit 31 connected with conduit 30.

The locking jack 34 entails a slide-valve 35 which controls, against the pressure of a spring 36, an outside unit (not shown in the drawing) and controls passage towards a conduit 37, connected with a distributor 38, the jack being connected to the return conduit by a conduit 39.

The distributor 38, which includes a slide-valve 40 subject to the action of spring 41 acting against the fluid pressure in conduit 37, may selectively link conduits 42 and 43, which end at the hydraulic motor 16, with a conduit 44 tied in with the high-pressure conduit 19 and with a low-pressure return conduit 45. The low-pressure return conduit 45 is connected in its middle section to a hydraulic damping flap 46, connected to orifices at the extremities ending at a conduit 47 and connected with the low-pressure return conduit 23.

Slide-valve 48, maintained at a middle position by springs 49 and 49a, consists of a calibrated conduit 50 which establishes a connection between the central conduit 45 of the distributor 38 and the return conduit 47. Slide-valve 48 also has a command rod 51, attached at pivot 52 to one end of a lever 53, the other end of which is attached at pivot 54 to a unit 55 controlling the return to position of the reversing units. At the midpoint of lever 53 is attached, around an axis or pivot 56, a rod 57 from the slide-valve 40 of the distributor.

To the high-pressure feed conduit 44 is attached a damping unit 58 which entails a command piston 59 which acts against a spring 60 to maintain the friction units 61, which directly connect with the drive shaft 15, in a damping or braking position.

The discharge conduit 47 is connected to a command jack 62, the piston 63 of which, on one of its surfaces, is subject to the action of the fluid from conduit 47 and, on its other surface, undergoes the action of a spring 64. This piston's rod 65 is attached at 66 to one end of a lever 67 controlling the angle of the plate of hydraulic motor 16 and, accordingly the capacity thereof. Conduit 47 is also connected with the low-pressure return conduit 23 through a principal flow restrictor 68 and with the high-pressure feed conduit by a recirculation valve 69, with a recirculation flow restrictor 70 being placed between the valve 69 and the conduit 19.

Figure 4A:
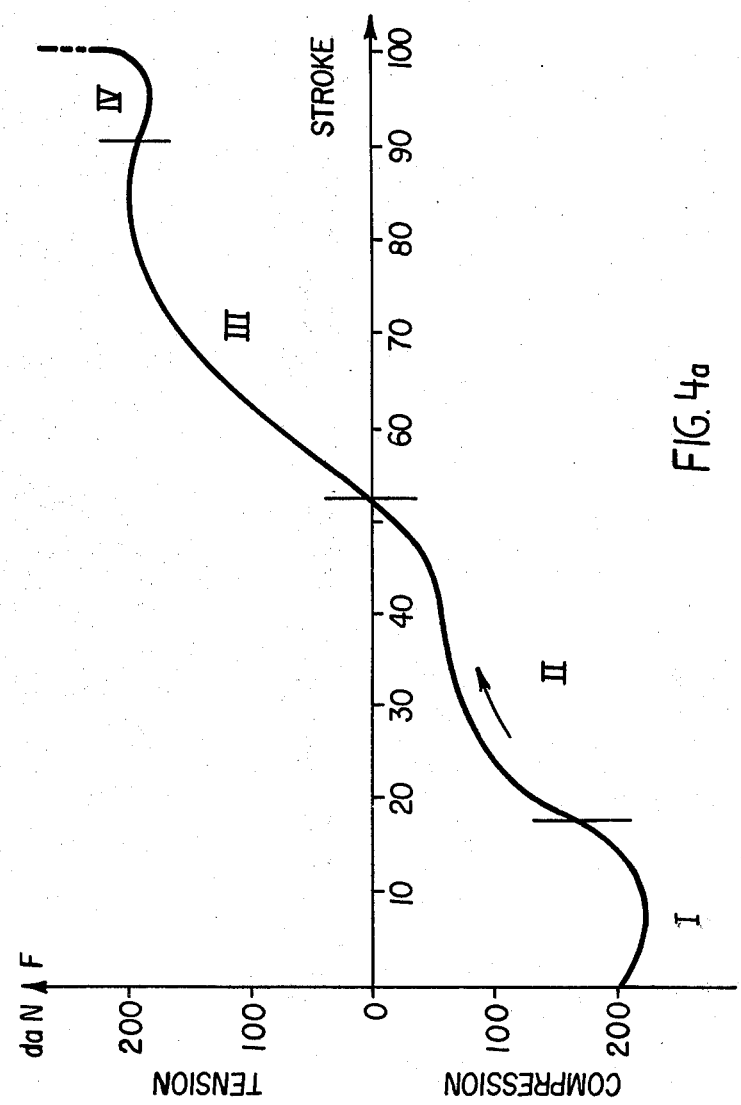

To reverse the flow, as represented in the lower part of FIG. 1, the jacks 10 subject to the compression and torque stresses represented on the curve of FIG. 4a, are acted upon in order to bring about the deployment of the flow reversal units 7 and 8.

When the feed gate 20 is in the open position, conduit 19 receives high-pressure fluid and excitation of electric gate 17 against the spring 25 causes the high-pressure feed conduit 18 to be connected with conduit 26, which causes rightward displacement of the slide-valve 28 of the position gate 27 up against the spring 29, allowing conduit 32, which is connected with the high-pressure feed, to be connected with conduit 33. Conduit 33 in turn leads to the locking jack 34, whose slide-valve 35 is moved to the right against the spring 36, thus connecting conduit 33 with conduit 37 which ends at one end of the slide-valve 40 of the distributor 38.

The slide-valve 40 of the distributor, as one of its ends is subjected to the action of the high-pressure fluid, moves in the direction of position D against the spring 41, thereby connecting conduit 42 of the engine with high pressure feed conduit 44 as well as connecting conduit 43 with return conduit 45, which ends at the damping gate.

The movement of the slide-valve 40 and its rod 57 causes the lever 53 to pivot around point 54, which at that time is a fixed point because the position return command unit 55 is in movement only during transit, and lever 53 then acts on slidevalve 48 which takes position D while compressing spring 49a. Return conduit 45 is thus connected with jack 62 which commands the capacity of engine 16 through conduit 47.

Moreover, as the damping unit 58 is fed with high-pressure fluid by conduit 19, it is in an open position making it possible for the reversal units to be activated by engine 16 which is fed. This gives rise to the first phase represented at I on the curve in FIG. 4a.

In the first fraction of a second, the engine speed being nil, the return pressure is minimal in conduit 47 and the spring 64 pushes the piston of command jack 62 to the left so that the capacity of engine 16 is set at its maximum level. For imparting initial velocity, therefore, maximum start-up torque is available.

The advance stress on the flexible shafts 12 and 13 is in both directions, a factor which helps start-up. This advance stress of the flexible shafts is retained thanks to the brake so long as feed gate 20 is closed.

During the second phase, which corresponds to the stress imparted at II on the jacks 10 and represented in FIG. 4a, the flow rises rapidly to the maximum imposed by the aircraft's feed circuit and flow restrictor 68 comes into play so that the load loss is increased through the restrictor. This arrangement makes is possible rapidly to achieve maximum flow and consequently to achieve maximum displacement velocity of the reversal units. The back pressure in conduit 47 therefore increases, causing movement of the piston 63 to the right by depressing spring 64, in such a way that lever 67 has an effect on the angle of the plate in engine 16 whose capacity is reduced. As a result, the capacity is modulated as a function of back pressure.

During the third phase (FIG. 4a), the jacks 10, which for 55 percent of their stroke had been subject to compression stresses, are then subject to tension stresses. When the loads become "helping" loads (aerodynamic loads and inertia reduced by friction), the engine 16 functions as a pump and the back pressure in conduit 47 increases all the more, which makes it possible to recycle the motor through itself, by way of recirculation valve 69, using feed conduits 19 and 44. This arrangement makes it possible to increase the flow circulating in the engine without it, as a result, consuming more of the flow of fluid from the aircraft's feed circuit. The increase in back pressure results in the engine's capacity being set at its lowest level.

In the presence of "helping" loads and as a result of engine 16 recycling through itself, such has a tendency to race so the flow restrictor 70 then comes into play in such a way that with the engine at its minimum capacity, its speed does not exceed a certain level.

During the fourth phase, the jacks 10 still function under tension as represented at IV on the curve in FIG. 4a.

The movement of the reversal units is therefore carried out until the mechanical position return unit 55 is activated in the direction of position D, central point 56 remains in the position initially taken by slide-valve 40 and the effect of this is movement of slide-valve 48 to the left, which begins to block off the orifice of the engine's exhaust conduit 45 and brings about an increase in the loss of load in the damping gate 46. As a result: (a) there is a decrease in the back pressure in chamber 72 of the jack 62 due to the increased load loss in the damping gate 46, from which there results a movement of the piston 63 to the left and an increase in the capacity of the motor, gradually rising toward its highest value; and (b) there is an increase in the loss of load through the slide-valve 48, bringing about an increase in pressure in the exhaust conduit 43 with the result that there is sizable damping or braking torque and the engine 16 acts as a pump. This damping torque is obtained without any excessive back pressures being required due to the fact that the motor is at its maximum capacity as indicated above.

When the reversal units come up against their stops at a slow speed, the slide-valve 48 takes up a midway position as a result of which it completely obstructs the exhaust conduit 45, leaving open only one orifice 50 with a small cross section in order to ensure that there is static torque against the stops until the feed gate 20 is closed and to keep the reversal device in its position with torsion of the flexible shafts 12 and 13 (FIG. 2) which presses them against their mechanical stops.

In this case, excitation of the electric gate 17 is interrupted and slide-valve 24, under pressure from spring 25, moves to the position represented in FIG. 3, as a result of which the high pressure conduit 18 is obstructed and conduit 21, tied in with the low pressure circuit, is connected with conduit 30 which ends up at position gate 27. Due to pressure from spring 29, slide-valve 28, which at both ends is acted upon by low-pressure fluid, is pushed back to the left, connecting low-pressure conduit 30 with conduit 33, which is tied in with locking jack 34 whose slide-valve 35 is pushed leftward by spring 36, connecting conduit 37 of the distributor with low-pressure conduit 39.

As the distributor is fed on one side by low-pressure fluid, the slide-valve 40, activated by the spring 41, moves in the direction of position E to the left. At the moment of the command the point of attachment 54 is fixed and lever 53 pivots around point 54 when the rod 57 of slide-valve 40 moves to the left. This results in movement of the point of attachment 52 and of slide-valve 48 toward the left, connecting conduit 45 with the low-pressure return conduit 47.

The feed of the engine 16 is reversed by slide-valve 40, as conduit 43 is tied in via conduit 44 with the high-pressure conduit 19 and conduit 42 is tied in via conduit 45 and gate 46 with the low-pressure return conduit 47. As above, the braking or damping unit is opened by putting feed gate 20 into action.

During this first phase and in the first fraction of a second, the velocity of engine 16 being nil, the back pressure in conduit 47 is at a minimum, allowing the piston 63 of jack 62, subject to the pressure of the spring 64, to return the lever 67 to a position such that the capacity of the engine 16 is at a maximum. Thus maximum starting torque is available for starting the engine in motion.

The advance tension on the flexible shafts 12 and 13 is in both directions, a factor which is helpful at startup, and the advance tension is conserved due to the brake 58 so long as the feed gate 20 is closed. During the second phase, with the flow then rapidly rising to the maximum flow imposed by the aircraft's feed circuit, the flow restrictor 68 comes into play and increases the loss of load within said flow restrictor. The device makes it possible rapidly to achieve maximum flow and the speed of movement of the reversal units is rapidly attained.

If the loads decrease, the back pressure in conduits 42, 45 and 47 increases, causing piston 63 of the jack 62 to move to the right so that the lever 67 occupies a position which reduces the capacity of the engine and makes it possible to modulate it as a function of the loads.

Figure 4B:
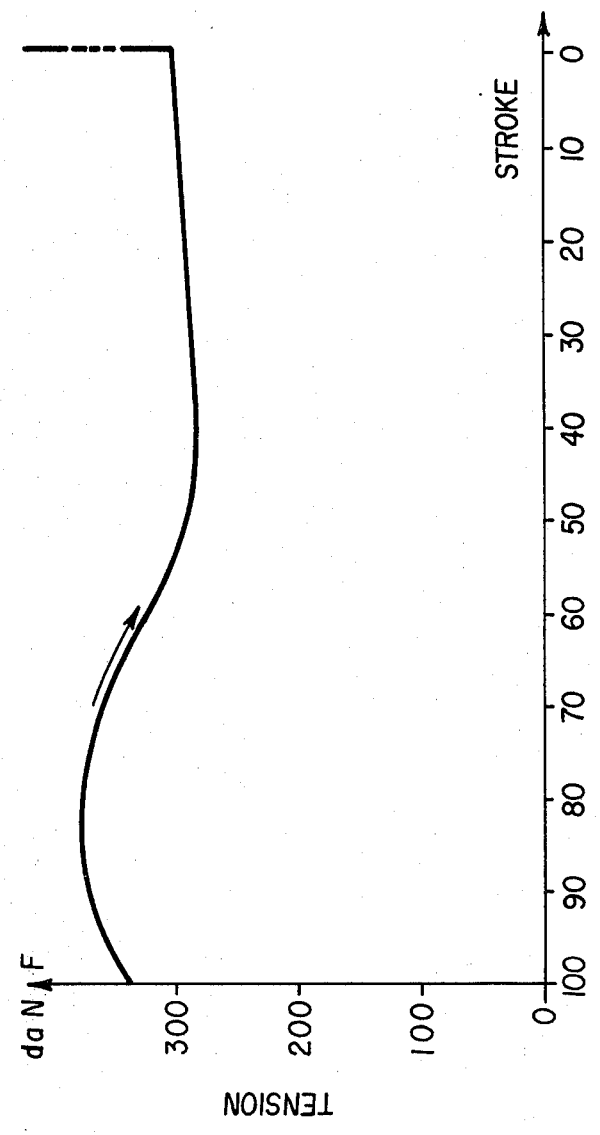

During the third phase, for the removal of the reversal units, since the outline of the load is still resistant as represented on the curve in FIG. 4b, there is no recirculation problem as the level of back pressure in conduit 47 remains very low. If, in another application, the loads in the reversal unit retraction phase were "helping", recirculation would then take place automatically.

During the fourth phase, which corresponds to damping at the end of the stroke, the movement of the reversal units continues until the mechanical position return unit 55 is activated in the direction of position E.

The central attachment point 56 of slide-valve 40 being fixed, there is a resulting pivoting of lever 53, which, by means of rod 51, brings slide-valve 48 to a central position where it begins to obstruct the engine's exhaust conduit 45. This has the effect of increasing the loss of load through gate 46, with the result that: (a) there is a drop in back pressure in chamber 72 as a result of the increased load loss in the gate 46, with the result that piston 63 moves to the left and the capacity is gradually increased to its highest value and (b) there is an increase in the loss of load through the slide-valve 48 bringing about an increase in pressure in the exhaust conduit 42 with the result that there is substantial damping or braking torque with the engine 16 acting as a pump. This damping torque is obtained without any excessive back pressures being required due to the fact that the motor is at its maximum capacity as indicated above.

When the reversal units come up against their stops at a slow speed, the slide-valve 48 takes up a midway position as a result of which it completely obstructs the exhaust conduit 45 leaving open only one orifice 50 with a small cross section in order to ensure that there is static torque against the stops until the feed gate 20 is closed and to keep the reversal device in its position with torsion of the flexible shafts 12 and 13 (FIG. 2). When the device functions with "resisting" loads, the pattern of operation is the same with the exception that there is no recirculation through valve 69 and the flow restrictor 70.

Figure 4C:
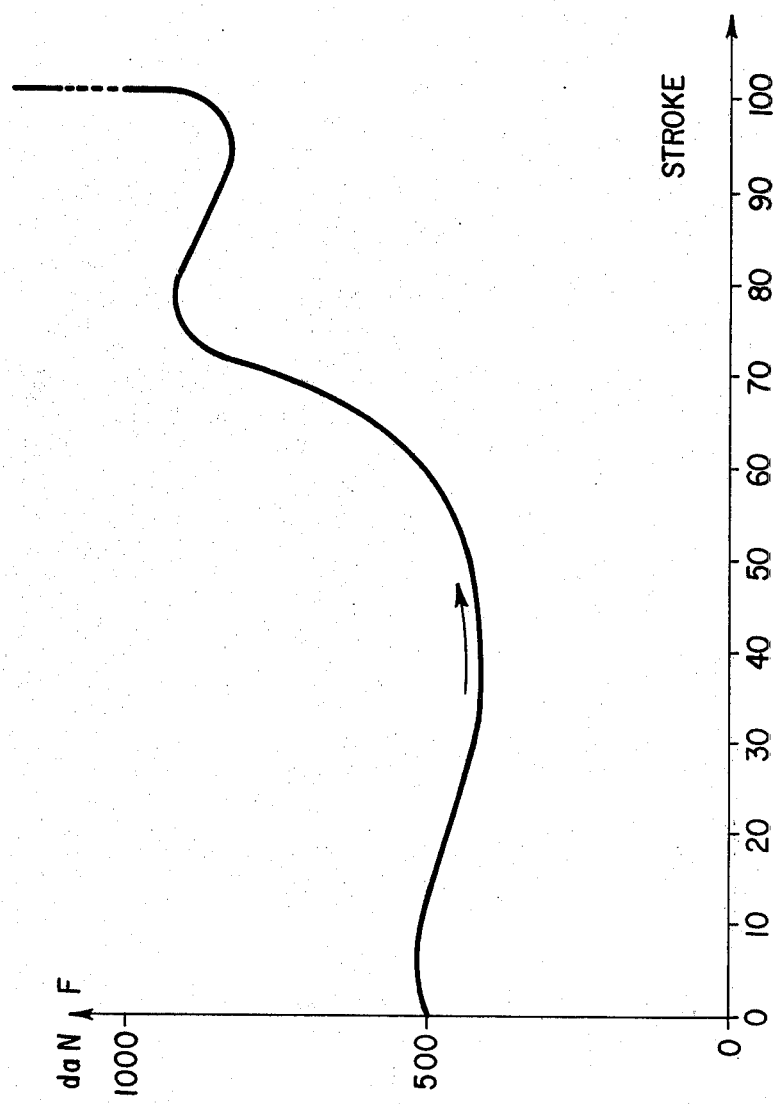

FIG. 4c is a representation of the stress curve for a jack 1 during the deployment of the reversal units at take-off. This is also a condition where the loads are "helping", as the jacks are under tension throughout the deployment. FIG. 4d represents a curve 73 of the stresses on a jack for its in-flight throttled-down operation and a curve 74 of the stresses on a jack for its on-the-ground throttled-down operation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A device for hydraulic control of thrust reversal for jet engines in which thrust reversal units which can be positioned in either a deployed or concealed position are activated by jacks which are connected through flexible units to a rotary hydraulic engine, fed under constant pressure by a hydraulic circuit comprising:
   means for slowing the speed of the reversal units upon approaching said deployed or concealed position; and
   means for directly subjecting the capacity of the engine to back pressure of the engine,
   wherein said means for directly subjecting the capacity of the engine to back pressure of the engine is not sensitive to the engine feed pressure and comprises a control jack having an output whose position determines engine capacity, means for communicating said output of said control jack only with a source of engine back pressure, and spring means in said control jack and adapted to oppose said back pressure, and wherein the direction of opposition of said spring means moves said output towards increased engine capacity.

2. The device as set forth in claim 1, said hydraulic circuit further comprising:
   a low pressure return conduit and high pressure conduit communicated with said engine;
   a hydraulic damping flap communicating with said engine via said return conduit;
   an engine feed distributor including mechanical position return means for controlling operation of said damping flap
   a first flow restriction device communicating with said return conduit for controlling pressure in said return conduit; and
   a calibrated recirculation valve communicating said return conduit with said feed conduit, whereby back pressure can be returned to the inlet of said engine.

3. The device as set forth in claim 2, said hydraulic circuit further comprising:
   a second flow restricting device connected between said caibrated valve and said feed conduit.

4. A device as set forth in claim 2, said distributor including a slide valve disposed therein and said damping flap further comprising:
   a housing;
   a slide valve disposed within said housing;
   rod means interconnecting said distributor slide valve with said damping flap slide valve; and
   means for biasing said damping slide valve to a midway position in said housing when said distributor slide valve communicates with said control jack.

5. A device as set forth in claim 2, said distributor including a slide valve disposed therein and said damping flap including a slide valve disposed therein and further comprising:
   rod means interconnecting said distributor slide valve and said damping flap slide valve with said thrust reverser units.

6. A device as set forth in claim 1, said hydraulic circuit further comprising:
   a high pressure feed conduit communicated with said engine;
   a drive shaft connected to said engine; and
   a damping unit which includes a piston and means for biasing said piston in a damping direction, said piston communicating with said feed conduit.

7. A device as set forth in claim 2, said hydraulic circuit comprising:
   a position gate including a slide-valve disposed therein intercommunicating said return conduit and said feed conduit by operation of said position gate slide-valve; and
   an electric gate for controlling operation of said piston gate slide valve.

8. A device as set forth in claim 7, said electric gate further comprising:
   a slide valve disposed therein intercommunicating said return conduit with said feed conduit and for operating said thrust reversal units.

9. A device as set forth in claim 8, further comprising:
   a feed gate communicating with said feed circuit which is disposed upstream of said electric gate.

10. A device as set forth in claim 2, said control jack including a piston and means for biasing said piston, said control jack piston communicating with said return conduit and further comprising:
    means for regulating the capacity of said engine; and
    rod means interconnecting said control jack piston and said means for regulating the capacity of said engine.

* * * * *